United States Patent [19]

Kimura et al.

[11] 3,947,749
[45] Mar. 30, 1976

[54] APPARATUS FOR GENERATING HIGH VOLTAGE FOR CATHODE-RAY TUBE

[75] Inventors: Isamu Kimura; Takumi Hayashi, both of Yokohama, Japan

[73] Assignee: Hitachi, Ltd., Japan

[22] Filed: Jan. 31, 1975

[21] Appl. No.: 546,124

[52] U.S. Cl. ............ 321/47; 178/DIG. 11; 336/182
[51] Int. Cl.² .......................................... H02M 7/10
[58] Field of Search .... 178/DIG. 11, 7.5 R, 7.5 DC; 321/2, 47; 323/48; 336/182

[56] References Cited
UNITED STATES PATENTS 3,562,623   2/1971   Farnsworth ............................ 321/2

*Primary Examiner*—William M. Shoop
*Attorney, Agent, or Firm*—Craig & Antonelli

[57] ABSTRACT

A high voltage generator suitably applied to the television receiver has a secondary winding divided into three or more units of different numbers of turns by a plurality of diodes. Each secondary winding unit has a different distance from the primary winding, so that the winding units are tuned to different high harmonics of the fifth or higher resonance orders, or some of the winding units to the same harmonic of fifth or high order and the remaining to harmonics.

12 Claims, 7 Drawing Figures

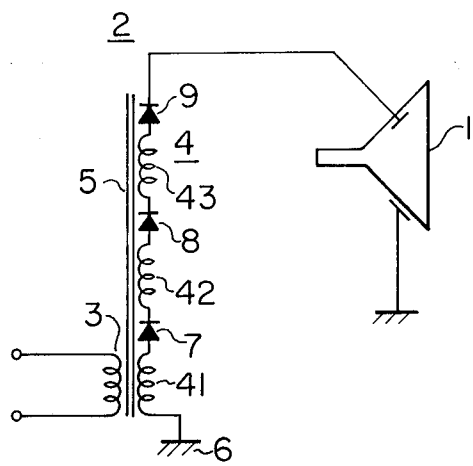
FIG. 1
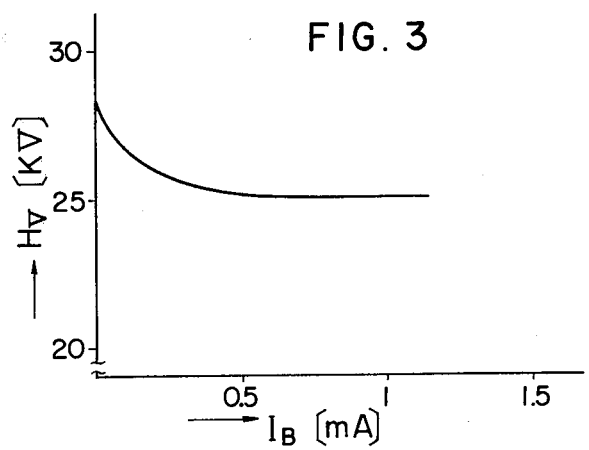
FIG. 2
FIG. 3

A: CHARACTERISTIC OF CONVENTIONAL SINGLE WINDING

B: CHARACTERISTIC OF HIGH VOLTAGE PLURAL WINDINGS OF THIS INVENTION

C: RESONANCE POINT IN AN EMBODIMENT OF THIS INVENTION

APPARATUS FOR GENERATING HIGH VOLTAGE FOR CATHODE-RAY TUBE

The present invention relates to a high voltage generator used for generating a DC high voltage for the cathode-ray tube, which is suitably applied to the television receiver.

Generally, the picture tube of the television receiver requires a DC high voltage of 7 to 25 KV for accelerating charged particles.

A well-known conventional device for producing such a high DC voltage includes a rectifier device comprising a flyback transformer and a rectifier element of high reverse breakdown voltage, or a voltage-multiplying rectifier device employing the Cockcroft-Walton accelerator circuit having a flyback transformer and a plurality of rectifier elements and capacitors.

In applying any of the above-described devices to the color television receiver, it is very important to maintain the produced high voltage as constant as possible or to hold the variations of the produced high voltage within a predetermined allowable range. This is in view of the fact that great variations in high voltage will cause color errors.

It is also well-known that the variation in high voltage is smaller the higher the order of harmonics for resonance.

The first of the above-mentioned well-known devices has the disadvantage that the great number of turns of the secondary winding results in a very large turn ratio, which in turn renders very high the value of the distributed capacity of the primary winding as converted from the secondary winding on the basis of the square of the turn ratio, thus limiting the high harmonic resonance up to the unsatisfactory third order.

The second of the above-mentioned conventional devices, on the other hand, is advantageous in that the greater the number by which the voltage is multiplied, the high voltage pulse generated may be smaller, so that the turn ratio between the primary and secondary windings and hence the distributed capacity is reduced accordingly, thereby making possible a device capable of a harmonic resonance at a higher order with less variation in high voltage. In spite of this advantage, the device under consideration must be provided with a plurality of capacitors for its rectification system, thus leading to the bulkiness and high cost of the device.

A well-known fact about the flyback transformer is that in order to improve the characteristics thereof by reducing the leakage inductance and distributed capacity of the secondary winding, the secondary winding is divided into a multiplicity of sections by a dividing bobbin. The U.S. Pat. No. 3,562,623 discloses a high voltage transformer in which the secondary winding arranged on a magnetic core together with the primary winding is divided into a plurality of winding units, which are connected alternately in series with a plurality of rectifier elements for rectification of the voltage across the respective winding units.

An object of the present invention is to provide an improved high voltage generator.

Another object of the invention is to provide an improved high voltage generator with less variation in high voltage.

Still another object of the invention is to provide a high voltage generator in which the coils of the winding are easily insulated.

According to the present invention, there is provided an apparatus for generating a high voltage for the cathode-ray tube comprising a primary winding, a secondary winding divided into a plurality of winding units by a plurality of diodes, and means for tuning said plurality of winding units to at least two high harmonics of odd-numbered orders including the fifth-order high harmonics and another high harmonics of a different order by changing the winding density distribution of the primary winding on the one hand and the number of turns of each winding unit of the secondary winding on the other.

To achieve the above-mentioned objects, the high voltage generator according to the present invention is characterized in that the secondary winding is divided into three or more winding units each connected in series with a diode thereby to constitute a series circuit as a whole, so that the combination of the primary inductance such as the deflection yoke connected to the secondary winding and the resonance capacitor is tuned to high harmonics with the combination of the stray capacity of each winding unit of the secondary winding and the leakage inductance to the primary winding. As a result, each of the winding units is tuned to high harmonics of the fifth or higher order separately, or some of them separately from the others.

The resonance order of high harmonics depends substantially on the product of the distributed capacity and the leakage inductance for a given pulse width, and therefore it is necessary to take into consideration the variation in leakage inductance in addition to the distributed capacity in order to determine the order of high harmonics for resonance.

A well-known method for adjusting the distributed capacity of the high voltage generator for the television receiver includes adjusting the winding width or height of the secondary winding or changing the ratio at which the distributed capacity of the secondary winding is converted into that of the primary winding, by dividing the secondary winding into a plurality of winding units and by changing the turn ratio between the primary and secondary windings. Further, as a method to adjust the leakage inductance, the distance between the primary and secondary windings is changed or alternatively the number of turns is changed while maintaining the turn ratio constant.

The present invention is based on a couple of ideas mentioned below.

First, since the secondary winding is divided into a plurality of winding units, the distributed capacity of the secondary winding as converted to that of the primary winding is very small at the time of independent energization of the divided winding units of the secondary winding. The resulting remarkable reduction in the distributed capacity of the secondary winding as converted into that of the primary side permits a resonant state to be achieved at the fifth or higher order harmonics with little variation in high voltage.

Secondly, the leakage inductance is adjusted as desired by changing not only the number of turns of each winding unit of the divided secondary winding but the winding density distribution of the primary winding.

In embodying the present invention by dividing the secondary winding into three winding units, for example, it should desirably be so constructed that two of the winding units be tuned to resonance at the seventh-order high harmonics and the remaining one winding unit at the fifth-order high harmonics.

The above and other objects, features and advantages will be made apparent by the detailed description taken in conjunction with the accompanying drawings, in which:

FIG. 1 is a circuit diagram showing the high voltage generator according to an embodiment of the present invention;

FIG. 2 is a winding arrangement in an example of the configuration of the circuit illustrated in FIG. 1;

FIG. 3 is a diagram showing the relation between beam current and high voltage;

Figure 4:
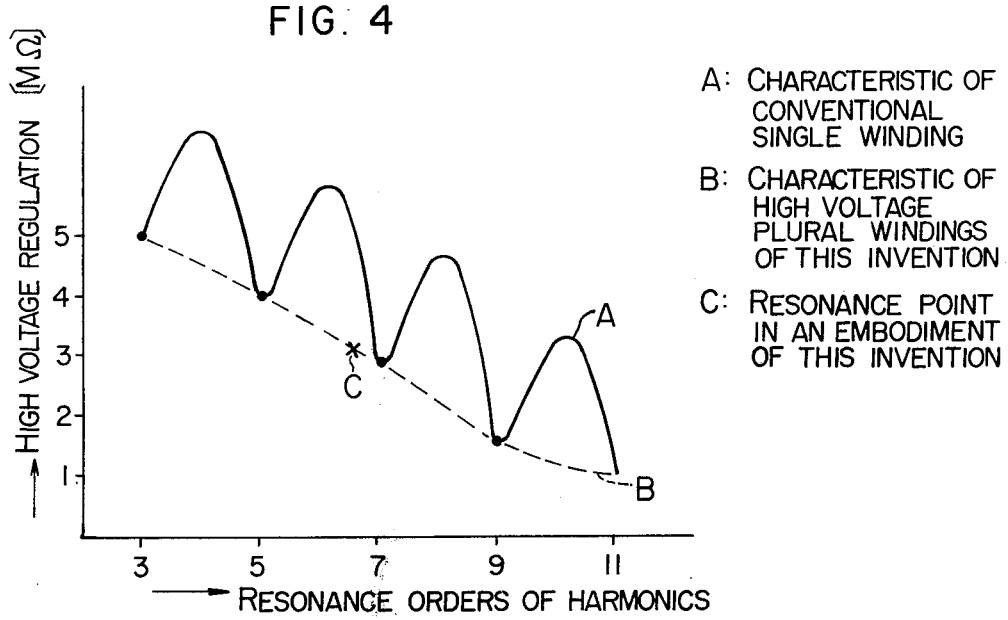
FIG. 4 is a graph showing a curve representing the relation between the number of order of resonant high harmonics and variations in high voltage.

An embodiment of the present invention will be described below with reference to the accompanying drawings.

In FIG. 1 showing the circuit arrangement of the high voltage generator according to the invention, reference numeral 1 shows a cathode-ray tube, and numeral 2 a transformer including a primary winding 3, a secondary winding 4 and an appropriate magnetic medium 5.

The secondary winding 4 are divided into three winding units or coils 41, 42 and 43. The winding unit 41 has an end thereof connected to the earth 6 and the other end connected to the diode 7. The winding unit 42 has an end thereof connected to the cathode of the diode 7 and the other end thereof to the anode of the diode 8. The winding unit 43 has an end thereof connected with the cathode of the diode 8 and the other end connected to the anode of the diode 9. The cathode of the diode 9 is connected to the anode of the cathode-ray tube 1.

In the circuit arrangement thus constructed, assuming that the frequency of 15,734 KHz is involved, the three winding units 41, 42 and 43 are energized simultaneously only for several microseconds of the period of approximately 63.55 $\mu s$ during which the diodes 7, 8 and 9 are energized, thereby producing a voltage three times higher than the high-voltage pulse produced by each winding unit. During the remaining period of approximately 60 $\mu s$, on the other hand, the winding coils 41, 42 and 43 are operatively separated from each other and energized independently. For this reason, the turn ratio between the primary and secondary windings is very small due to the fact that the distributed capacity of the winding units 41, 42 and 43 takes the form of series connection, thereby remarkably reducing the distributed capacity of the secondary side as converted into that of the secondary winding.

The circuit arrangement of FIG. 1 based on the aforementioned first and second ideas is such that the secondary winding is divided into three winding units to reduce the distributed capacity thereof, while at the same time differentiating the three winding units in the distance from the primary winding, with the result that the winding units 41 and 42 are tuned to resonance at the seventh high harmonic and the winding unit 43 at the fifth high harmonic.

Description will be made below of an example of means for tuning to resonance the winding units 41 and 42 at the seventh-order high harmonic and the winding unit 43 at the fifth-order high harmonic, with reference to FIG. 2.

In the example under consideration, the total number of turns of the secondary winding is divided into the number of turns 908T of the winding 41, the number of turns 1064T of the winding unit 42 and the number of turns 1158T of the winding unit 43. The primary windng is rendered dense at its winding unit 41 side involving a smaller number of turns and coarse at the winding unit 43 side involving a greater number of turns. In other words, the primary winding is provided in eight densities of 15T, 26T, 15T, 15T, 15T, 10T, 10T and 10T as viewed from the winding unit 41 side so that the winding units are tuned to resonance at the high harmonics of the above-mentioned orders respectively.

In the embodiment under consideration, even though the turn ratio between the primary winding and the whole secondary winding is constant, the fact that the number of turns is different for each of the winding units of the secondary winding causes the conversion ratio between the primary winding and the respective winding units of the secondary winding to be different from each other, resulting in different distributed capacities for different winding units. Further, in adjusting the leakage inductance between each of the windings units and the primary winding, in FIG. 1 the inductance is first measured between the terminals of the primary winding with the respective secondary winding units of 41, 42, and 43 short-circuited and, in this state, the winding density of the primary winding and the leakage inductance between the divided windings are adjusted to provide distributed capacity and leakage inductance whose product substantially meets condition for resonance with harmonics of desired orders.

According to the present invention, it is possible to tune to resonance the two winding units 41 and 42 at the seventh high harmonic and the resulting winding unit 43 at the fifth high harmonic by the use of the above-described means.

The high voltage generator according to the invention which is capable of dual high harmonics resonance of the fifth and seventh orders as mentioned above has the beam current-high voltage characteristics as shown in FIG. 3. It will be obvious from the diagram under construction that a superior characteristic is obtained in which the high voltage generated undergoes little change with the increase or decrease in beam current.

Referring to FIG. 4 showing the variations in high voltage as against the resonance orders of high harmonics, an inferior curve A results when the winding units 41, 42 and 43 are not in resonance, whereas a curve B having a middle point lacking in curve A is obtained when the winding unis 41, 42 and 43 are in resonant state at the respective high harmonics.

Figure 5:
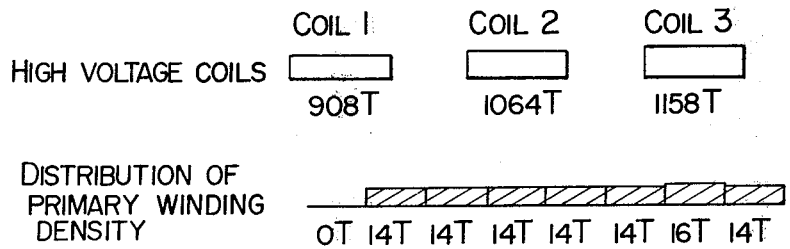
FIG. 5 is a winding arrangement in another example of the circuit configuration similar to that of FIG. 2.

Another example for achieving the objects of the invention is shown in FIG. 5, whereby the winding unit 41 is tuned to resonance at the fifth high harmonic and the winding units 41 and 43 at the seventh high harmonic.

In this embodiment, the number of turns of the winding units 41, 42 and 43 of the secondary winding is the same as that of the example shown in FIG. 2. The density distribution of the primary winding 3 is such that the density thereof is higher toward the winding units 42 and 43 of the secondary winding thereby to render the leakage inductance of the winding unit 41 greater than that of the winding unit 43, the primary winding 3 being formed in seven different ways.

This embodiment has the same characteristics shown in FIG. 3 and FIG. 4 as those of the embodiment shown in FIG. 2 and provides a superior device with little variations in high voltage.

Figure 6:
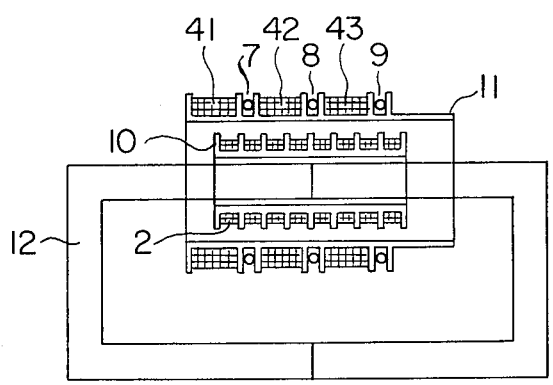
FIG. 6 is a sectional diagram showing the construction of the high voltage generator having the circuit configuration of FIG. 1 and produced by the method shown in FIG. 2.

The diagram of FIG. 6 illustrates an actual construction of the embodiments shown in FIG. 1 and FIG. 2, in which the primary winding 3 is arranged on the primary dividing bobbin 10 in eight different divisions, while the secondary winding 4 is divided into three winding units on the secondary dividing bobbin 11. The winding units 41, 42 and 43 are connected by the diodes 7, 8 and 9 respectively thereby to make up a series circuit as a whole. The primary and secondary windings are connected by an appropriate magnetic medium 12.

Unlike the above-described manner in which the secondary winding is divided and arranged, they may alternatively be divided and arranged in different layers with paper or in other proper ways. Also, each winding unit may be subdivided into smaller units.

The present invention enables the high voltage pulses to be reduced in amplitude, thereby facilitating insulation. Also, it is possible to obtain a low-cost, compact and superior device capable of high harmonic resonance with little high voltage variation due to a greatly reduced distributed capacity.

Furthermore, by varying the distance between the primary winding and each of the winding units of the secondary winding and by varying the number of turns of each winding units of the secondary winding, different resonance can be effected for different winding units, thus making it possible to obtain a superior device which is subjected to less variations in high voltage as a whole.

Figure 7:
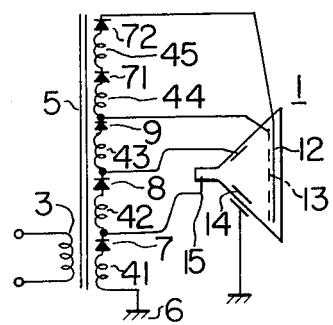
FIG. 7 is a circuit diagram showing the high voltage generator according to another embodiment of the present invention.

A further modification of the invention is shown in FIG. 7. By dividing the secondary winding 4 into a plurality of winding units by means of a plurality of diodes, different voltages can be applied to the phosphor electrode 12, mask electrode 13, funnel electrode 14 and focus electrode 15 of the cathode-ray tube 1.

It will thus be seen that the objects set forth above, among those made apparent from the preceding description, are efficiently attained, and since certain changes may be made in the above constructions without departing from the spirit and scope of the invention, it is intended that all matters contained in the above description or shown in the accompanying drawings shall be interpreted as illustrative and not in a limiting sense.

What is claimed is:

1. An apparatus for generating a high voltage for the cathode-ray tube comprising a primary winding, a secondary winding divided into a plurality of winding units by a plurality of diodes, and means for tuning said plurality of winding units to at least two high harmonics of different odd-numbered orders including the fifth-order harmonics and another high harmonics of a different order by differentiating the winding density distribution of said primary winding on the one hand and the number of turns of each of said winding units of said secondary winding on the other.

2. An apparatus according to claim 1, wherein said means for tuning provide said plurality of winding units to different order harmonics of odd-numbered orders equal to and higher than the fifth-order in which at least two harmonics of orders include the fifth-order harmonics and another order harmonics higher than that of the fifth-order.

3. An apparatus according to claim 1, wherein a dividing bobbin is provided having dividing winding sections, and wherein said winding units of said secondary winding are wound on said winding sections respectively so that at least two winding units wound on respective winding sections are different in number of turns.

4. An apparatus according to claim 1, wherein a primary dividing bobbin and a secondary dividing bobbin are provided, each of said primary and secondary dividing bobbins having divided winding sections, and wherein said primary winding is wound on said winding sections of said primary dividing bobbin so that winding portions wound on at least two of said winding sections of said primary dividing bobbin are different in number of turns to differentiate the winding density distribution of said primary winding, said winding units of said secondary winding being wound on said winding sections of said secondary dividing bobbin respectively so that at least two winding units wound on respective winding sections are different in number of turns.

5. An apparatus according to claim 1, wherein at least one of said plurality of diodes provides means for supplying voltage to electrodes of a cathode-ray tube.

6. An apparatus according to claim 1, wherein each of said plurality of winding units of said secondary winding have a different number of turns being a predetermined function of a minimum number of turns of one of said winding units.

7. An apparatus according to claim 1, wherein said primary winding is divided into a plurality of winding units, each of said plurality of primary winding units having a different number of turns being a predetermined function of a minimum number of turns of one of said primary winding units.

8. A high voltage generator for a cathode-ray tube of a television receiver comprising a primary winding, a secondary winding divided into a plurality of winding units by a plurality of diodes, and means for tuning at least one of said plurality of winding units to a resonance order of at least the fifth-order harmonic and tuning at least another of said plurality of winding units to an odd-numbered resonance order higher than said fifth-order harmonic, said means for tuning providing a different number of turns in each of said secondary winding units and adjusting the winding density distribution of said primary winding relative to said different number of turns.

9. A high voltage generator according to claim 8 wherein said means for tuning provides each of said winding units to a resonance order of at least the fifth-order harmonic.

10. A high voltage generator according to claim 9, wherein one of said winding units is provided to the fifth-order harmonics, and the remaining winding units are provided to different odd-numbered order harmonics higher than that of the fifth-order.

11. A high voltage generator according to claim 9, wherein at least two winding units are provided to the fifth-order harmonics, and the remaining winding units are provided to different odd-numbered orders higher than that of the fifth-order.

12. A high voltage generator according to claim 8, wherein at least one of said plurality of diodes provides means for supplying voltage to electrodes of a cathode-ray tube.

* * * * *